(12) United States Patent
Pipp, Jr.

(10) Patent No.: US 9,567,984 B2
(45) Date of Patent: Feb. 14, 2017

(54) LATCH WITH ROTARY SMA ACTUATOR

(71) Applicant: A. Raymond & Cie, Grenoble (FR)

(72) Inventor: Walter B. Pipp, Jr., Birmingham, MI (US)

(73) Assignee: A. Raymond & Cie, Grenoble (FR)

( * ) Notice: Subject to any disclaimer, the term of this patent is extended or adjusted under 35 U.S.C. 154(b) by 366 days.

(21) Appl. No.: 14/164,560

(22) Filed: Jan. 27, 2014

(65) Prior Publication Data

US 2014/0210219 A1 Jul. 31, 2014

Related U.S. Application Data

(60) Provisional application No. 61/759,182, filed on Jan. 31, 2013.

(51) Int. Cl.
| | |
|---|---|
| *E05C 5/00* | (2006.01) |
| *F03G 7/06* | (2006.01) |
| *E05C 1/12* | (2006.01) |
| *E05B 81/02* | (2014.01) |
| *E05B 47/00* | (2006.01) |
| *E05C 9/04* | (2006.01) |
| *D06F 39/14* | (2006.01) |
| *D06F 37/28* | (2006.01) |

(52) U.S. Cl.
CPC ............... *F03G 7/065* (2013.01); *D06F 37/28* (2013.01); *D06F 39/14* (2013.01); *E05B 47/0009* (2013.01); *E05B 81/02* (2013.01); *E05C 1/12* (2013.01); *E05C 9/043* (2013.01); *Y10T 292/1021* (2015.04)

(58) Field of Classification Search
CPC .......... F03G 7/065; D06F 37/28; D06F 39/14; E05B 47/0009; E05B 81/02; E05C 1/12
See application file for complete search history.

(56) References Cited

U.S. PATENT DOCUMENTS

| | | | |
|---|---|---|---|
| 4,342,476 A | 8/1982 | Brown et al. | |
| 4,551,975 A | 11/1985 | Yamamoto et al. | |
| 4,761,955 A * | 8/1988 | Bloch | F03G 7/065 60/527 |

(Continued)

FOREIGN PATENT DOCUMENTS

| | | |
|---|---|---|
| JP | 60196482 | 10/1985 |
| JP | 07-103129 | 4/1995 |

(Continued)

*Primary Examiner* — Hanh V Tran
(74) *Attorney, Agent, or Firm* — Harness, Dickey & Pierce P.L.C.

(57) ABSTRACT

A rotary actuator includes a plurality of plate members stacked and coupled together for rotation relative to each other. A biasing member provides a biasing force tending to cause a rotatable end plate member to rotate in a biasing direction relative to a non-rotatable end plate member. Each plate member has a plurality of notches at its periphery. A SMA wire extends through the plurality of notches so that as the SMA wire is heated, the SMA wire rotates each rotatable plate member from a cold position in a direction opposite the biasing direction to a hot position. As the SMA wire cools, the biasing member rotates each rotatable plate member in the biasing direction from the hot position and returns each rotatable plate member to the cold position.

23 Claims, 16 Drawing Sheets

(56) References Cited

U.S. PATENT DOCUMENTS

| | | | | |
|---|---|---|---|---|
| 4,811,564 A | * | 3/1989 | Palmer | F03G 7/065 60/527 |
| 4,829,767 A | * | 5/1989 | Mecca | F03G 7/065 60/527 |
| 4,887,430 A | | 12/1989 | Kroll et al. | |
| 4,930,494 A | * | 6/1990 | Takehana | A61B 1/00147 600/145 |
| 4,965,545 A | | 10/1990 | Johnson | |
| 5,575,764 A | * | 11/1996 | Van Dyne | A61F 5/0125 482/124 |
| 5,727,391 A | * | 3/1998 | Hayward | B25J 9/1085 248/636 |
| 5,975,468 A | * | 11/1999 | Moignier | F03G 7/065 244/172.7 |
| 6,036,241 A | | 3/2000 | Ostdiek et al. | |
| 6,058,946 A | | 5/2000 | Bellati et al. | |
| 6,447,478 B1 | * | 9/2002 | Maynard | F03G 7/065 600/151 |
| 6,832,477 B2 | * | 12/2004 | Gummin | F03G 7/065 60/527 |
| 6,851,260 B2 | | 2/2005 | Mernoe | |
| 7,210,315 B2 | | 5/2007 | Castelli et al. | |
| 7,270,135 B2 | | 9/2007 | Virgilio et al. | |
| 7,575,807 B1 | * | 8/2009 | Barvosa-Carter | F03G 7/065 428/411.1 |
| 7,703,281 B2 | | 4/2010 | Kosaka et al. | |
| 7,775,596 B2 | * | 8/2010 | Kennedy | B60N 2/20 297/361.1 |
| 2002/0046622 A1 | * | 4/2002 | Yoshida | F03G 7/065 74/574.4 |
| 2003/0128491 A1 | * | 7/2003 | Bueno Ruiz | B64G 1/222 361/115 |
| 2005/0000574 A1 | * | 1/2005 | MacGregor | B60H 1/00671 137/625.3 |
| 2005/0005705 A1 | * | 1/2005 | Vestel | F03G 7/065 73/789 |
| 2006/0037315 A1 | * | 2/2006 | Zanella | H02N 2/101 60/527 |
| 2008/0034749 A1 | | 2/2008 | Ukpai et al. | |
| 2008/0034750 A1 | | 2/2008 | Gao et al. | |
| 2008/0100079 A1 | * | 5/2008 | Herrera | B60R 7/06 296/37.1 |
| 2008/0185541 A1 | | 8/2008 | Ukpai et al. | |
| 2009/0193854 A1 | | 8/2009 | Chang et al. | |
| 2010/0251783 A1 | | 10/2010 | Barzizza et al. | |
| 2010/0307202 A1 | | 12/2010 | Maentele et al. | |
| 2011/0120113 A1 | * | 5/2011 | Alexander | F02G 5/04 60/527 |
| 2011/0312454 A1 | | 12/2011 | Comsa et al. | |
| 2012/0120513 A1 | * | 5/2012 | Kotanagi | F03G 7/065 359/824 |
| 2012/0239183 A1 | | 9/2012 | Mankame et al. | |
| 2012/0255750 A1 | | 10/2012 | Isobe et al. | |

FOREIGN PATENT DOCUMENTS

| | | |
|---|---|---|
| JP | 09-268969 | 10/1997 |
| JP | 2005-207409 | 4/2005 |
| JP | 2005-233062 | 9/2005 |
| WO | WO2011/141183 | 11/2011 |

* cited by examiner

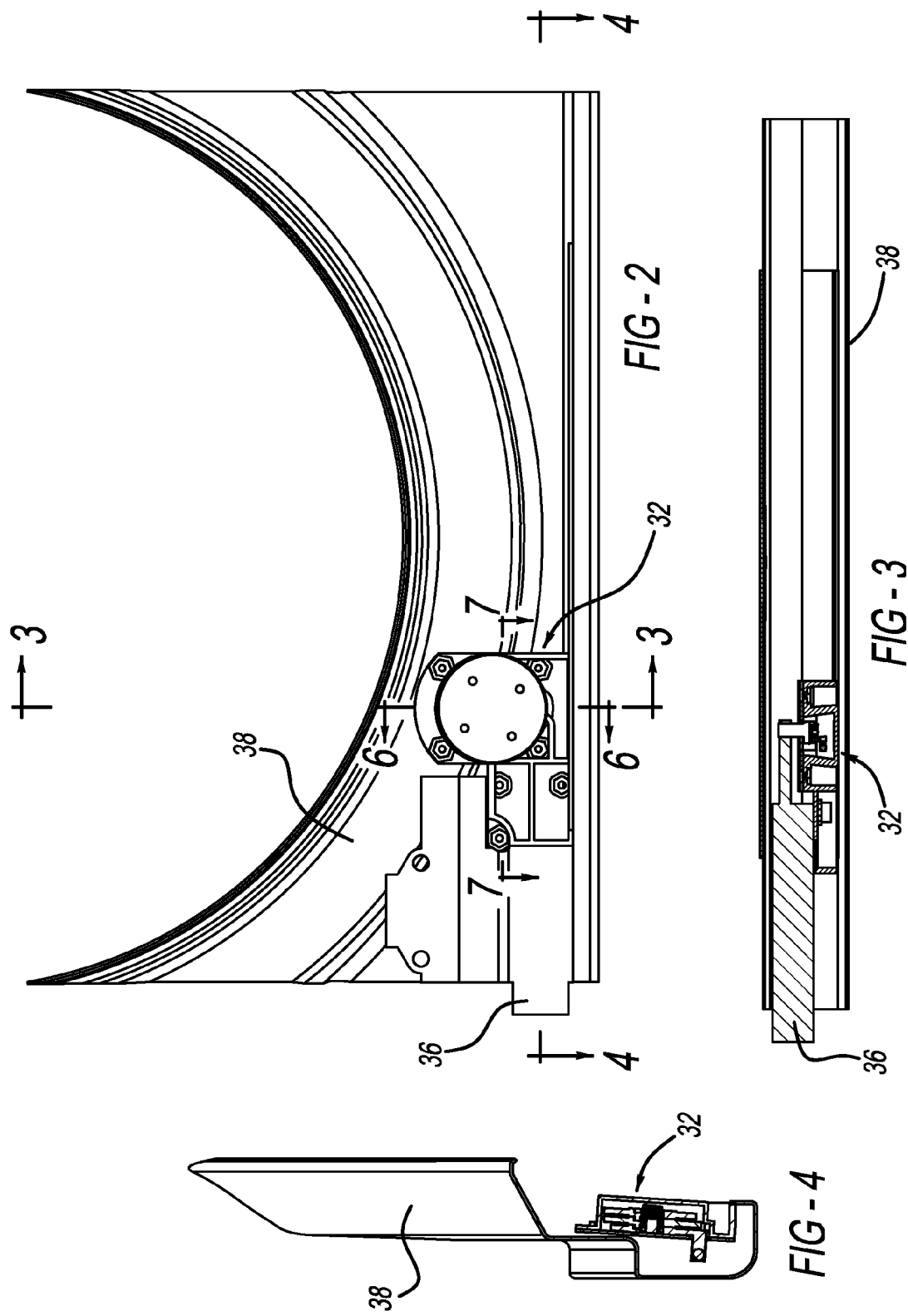

LATCH WITH ROTARY SMA ACTUATOR

CROSS-REFERENCE TO RELATED APPLICATIONS

This application claims the benefit of U.S. Provisional Application No. 61/759,182, filed on Jan. 31, 2013. The entire disclosure of the above application is incorporated herein by reference.

FIELD

The present disclosure relates to appliance and automobile latches that are electrically actuated and a rotary SMA actuator therefor.

BACKGROUND

This section provides background information related to the present disclosure which is not necessarily prior art.

Latches for appliances and automobiles are typically actuated by a motor. Such motors, however, are relatively expensive, heavy, and large. This makes them problematic to mount within the space available for movable covers or doors for appliances and automobiles.

A shape memory alloy (SMA) can be used to actuate a latch. Such latches typically use SMA members having relatively large cross-sections. This makes them slow to cool and return to their original shape. Thus, the cycle rate of such latches is too long for appliances and automobiles.

SMA actuators also typically have voltage and current requirements that are higher than desirable in appliance and automobile applications. Other potential limitations of SMA actuators include limited travel distance, and limited torque; particularly in a small package size.

SUMMARY

This section provides a general summary of the disclosure, and is not a comprehensive disclosure of its full scope or all of its features.

In one aspect of the present disclosure a rotary actuator is provided that includes a plurality of plate members. The plurality of plate members include a non-rotatable end plate member having a plurality of notches at its periphery, a rotatable end plate member comprising a plurality of notches at its periphery, and at least one intermediate rotatable plate member having a plurality of notches at its periphery. The at least one intermediate rotatable plate member is sandwiched in a stack between the non-rotatable end plate member and the rotatable end plate member. A biasing member provides a biasing force tending to cause the rotatable end plate member to rotate in a biasing direction relative to the non-rotatable end plate member. A SMA wire extends through the plurality of notches so that generally helical wire paths all extend in one of the clockwise or counterclockwise direction from the non-rotatable end plate member to the rotatable end plate member. As the SMA wire is heated, the SMA wire rotates each rotatable plate member from a cold position in a direction opposite the biasing direction to a hot position. As the SMA wire cools, the biasing member rotates each rotatable plate member in the biasing direction from the hot position and returns each rotatable plate member to the cold position.

In another aspect of the present invention a rotary actuator wherein opposing faces of adjacent plate members stacked together are separated from each other to provide an open space between the opposing faces of each pair of adjacent plate members. A SMA wire extends through the plurality of notches so that a plurality of wire paths extend between the non-rotatable end plate member and the rotatable end plate member, wherein every one of the plurality of wire paths includes at least one segment of the SMA wire positioned within the open space between the opposing faces of each pair of adjacent plate members without contacting any segment of the SMA wire defining any other wire path.

In other aspects of the present disclosure an appliance (or automobile) door latch includes a latch member movably coupled to one of an appliance (or automobile) body and an appliance (or automobile) door. A cooperating latch member is non-movably coupled to the other of the one of an appliance (or automobile) body and an appliance (or automobile) door. A rotary actuator includes a plurality of plate members arranged in a stack and coupled together to rotate relative to each other with a non-rotatable end plate member at an end of the stack and a rotatable end plate member at an opposite end of the stack. The rotatable end plate member comprises a pin member. A biasing member provides a biasing force tending to cause the rotatable end plate member to rotate in a biasing direction relative to the non-rotatable end plate member. A SMA wire forming a plurality of wire paths that all extend in one of a clockwise or counterclockwise direction from the non-rotatable end plate member and the rotatable end plate member and engaging each of the plurality of plate members. The SMA wire is coupled to an electrical system of the appliance (or automobile) via a switch to selectively apply an electrical current to the SMA wire. When the electrical current is applied to the SMA wire, the SMA wire rotates each of the plurality of plate members in a direction opposite the biasing direction relative to the non-rotatable end plate member to move the pin member to a hot position. When the electrical current is removed from the SMA wire, the biasing member rotates each of the plurality of plate members in the biasing direction relative to the non-rotatable end plate member to move the pin member to a cold position. Movement of the pin member between the hot and cold positions causes the movable latch member to move between a locked and an unlocked state.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 2 is a bottom plan view of the appliance latch of FIG. 1;

FIG. 3 is a cross-sectional view taken along line 3-3 of FIG. 2;

FIG. 4 is a cross-sectional view taken along line 4-4 of FIG. 2;

Corresponding reference numerals indicate corresponding parts throughout the several views of the drawings.

DETAILED DESCRIPTION

Figure 1:
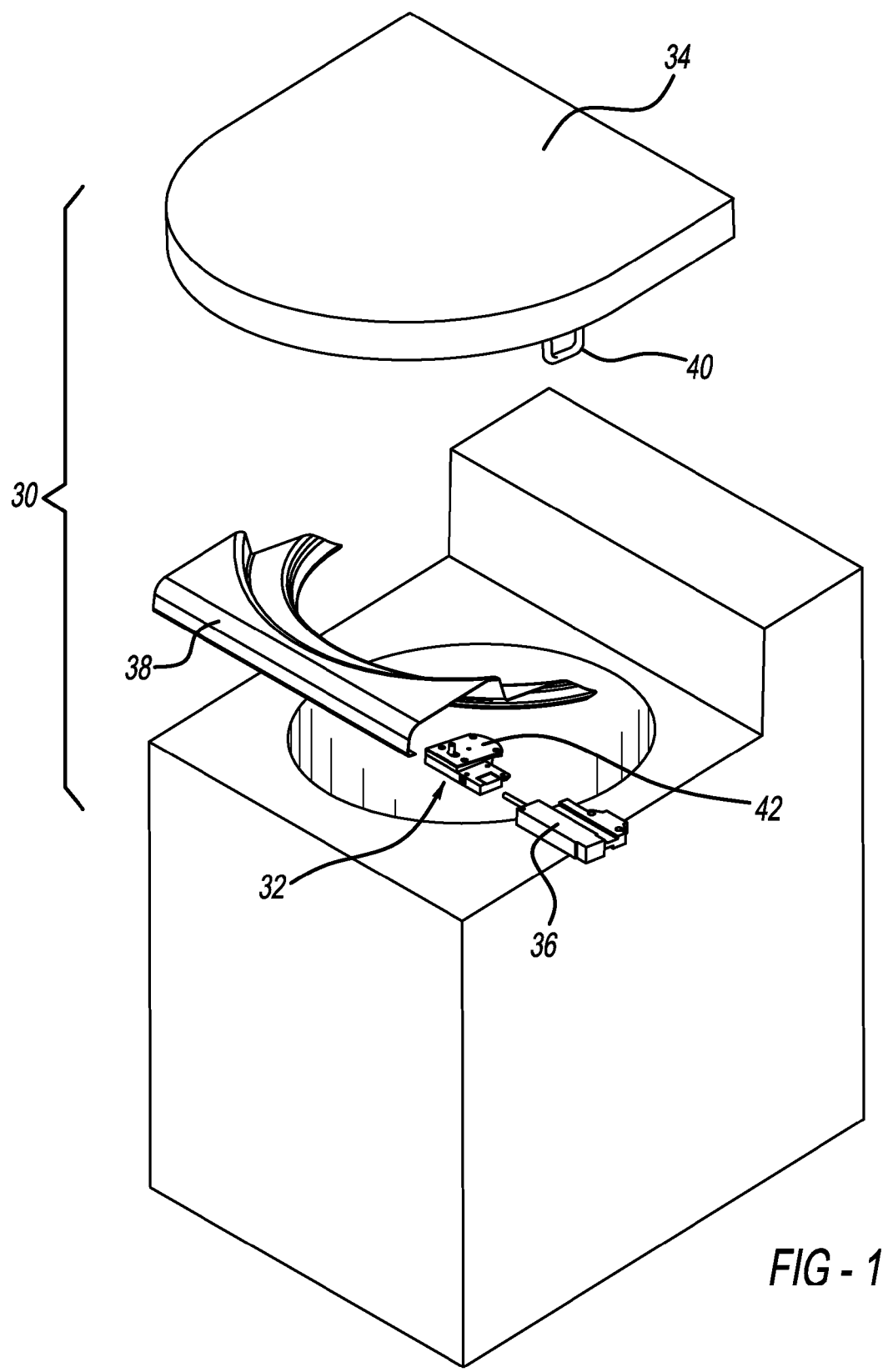
FIG. 1 is a perspective view of an appliance including a latch comprising a rotary actuator of the present disclosure.
Figure 5:
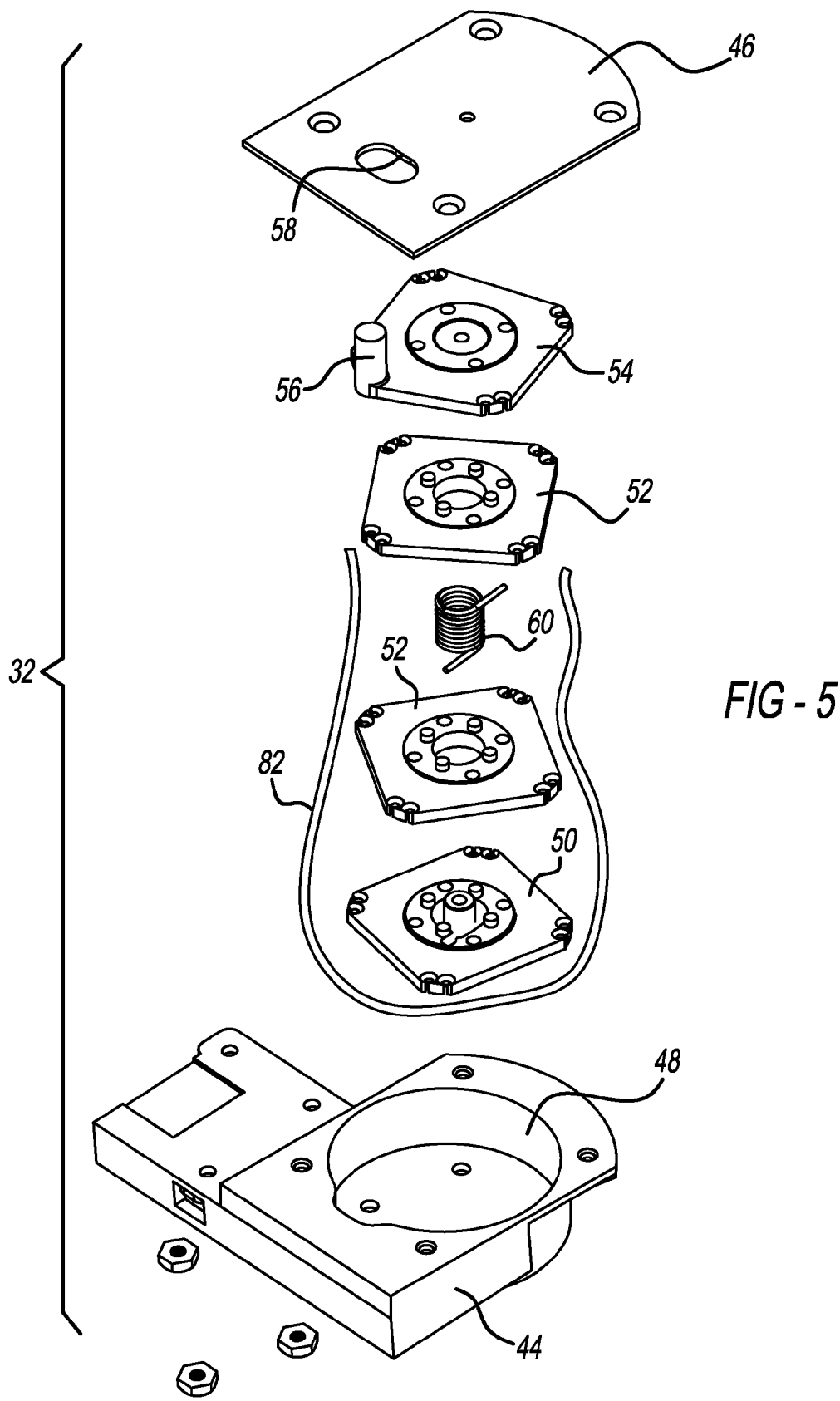
FIG. 5 is an exploded view of the rotary actuator of FIG. 1.
Figure 6:
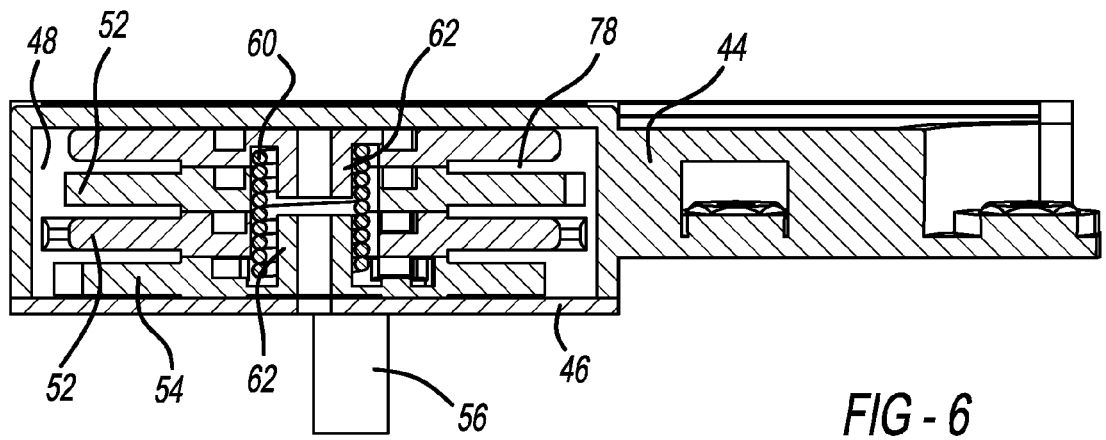
FIG. 6 is a cross-sectional view taken along line 6-6 of FIG. 2.
Figure 7:
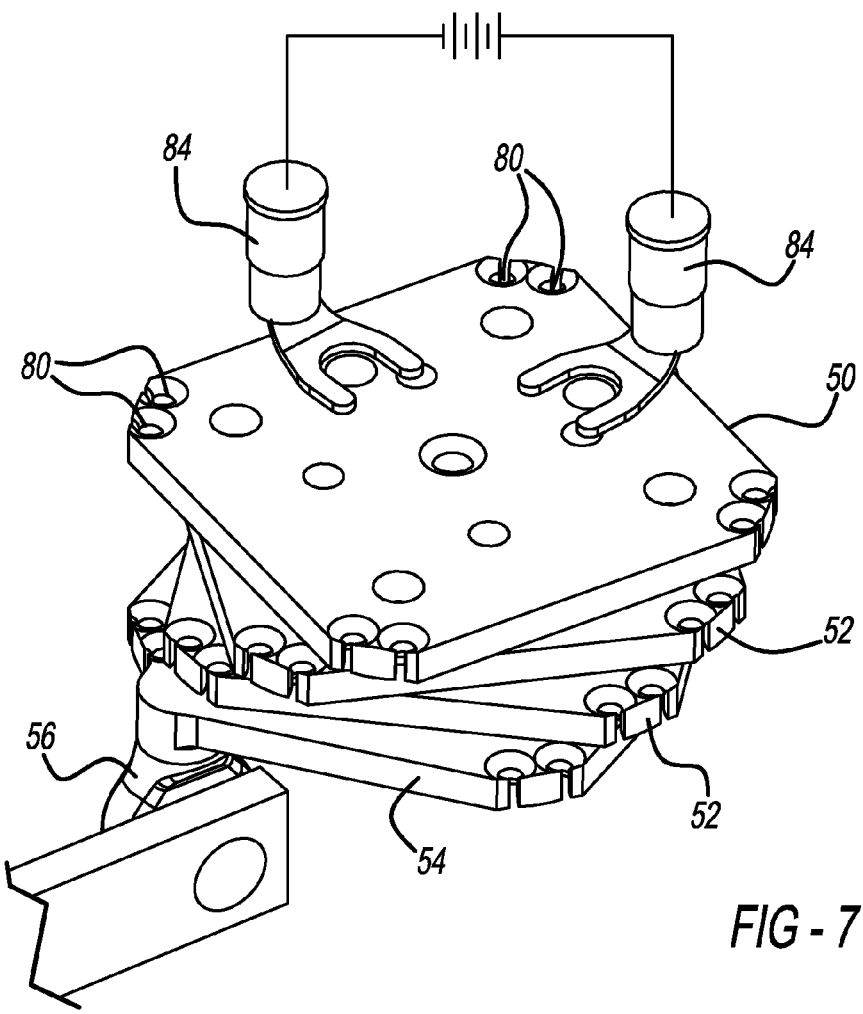
FIG. 7 is a perspective view of various components of the rotary actuator of FIG. 1.
Figure 8:
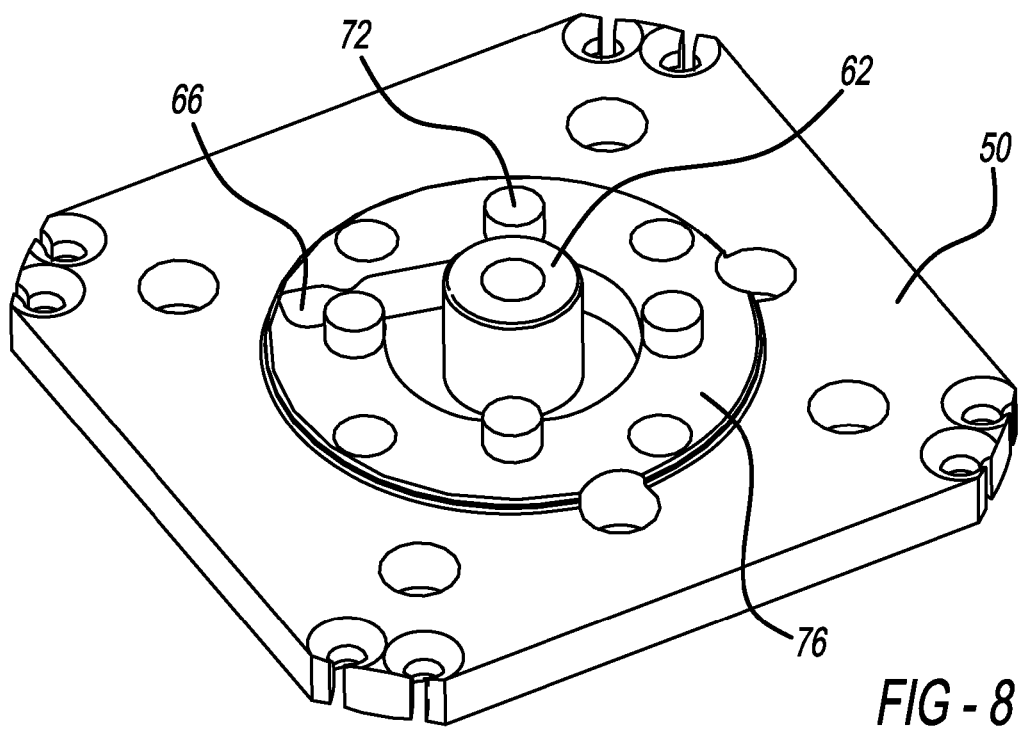
FIG. 8 is a perspective view of the non-rotatable plate member of the rotary actuator of FIG. 1.
Figure 9:
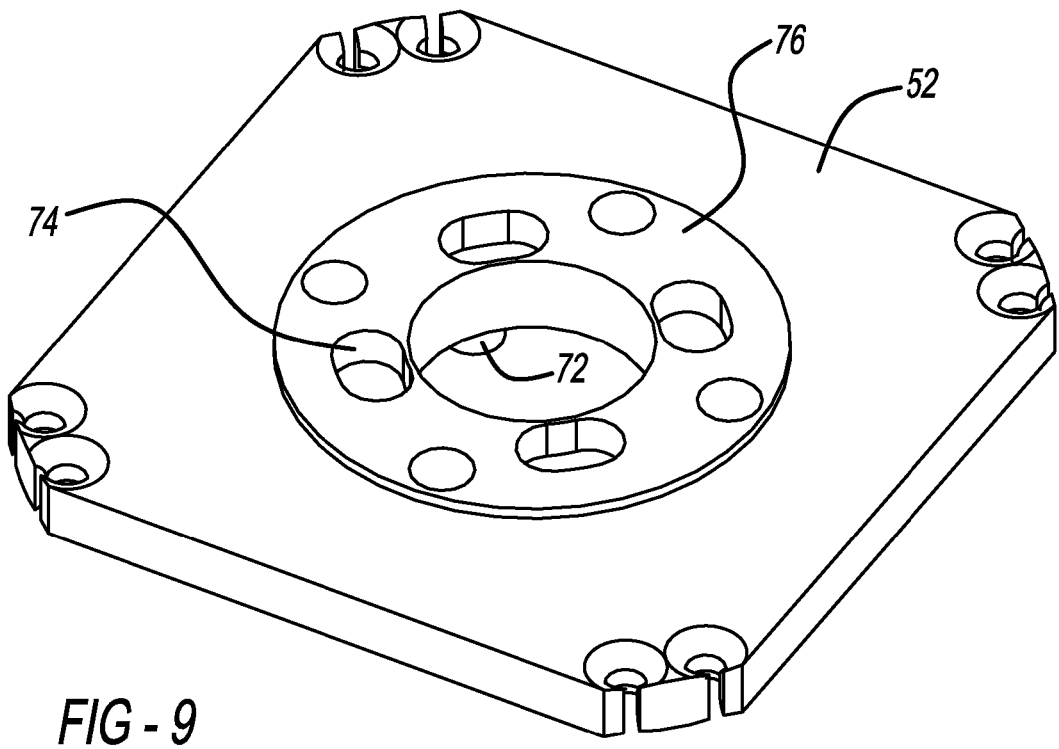
FIG. 9 is a perspective view of an intermediate plate member similar to FIG. 8.
Figure 10:
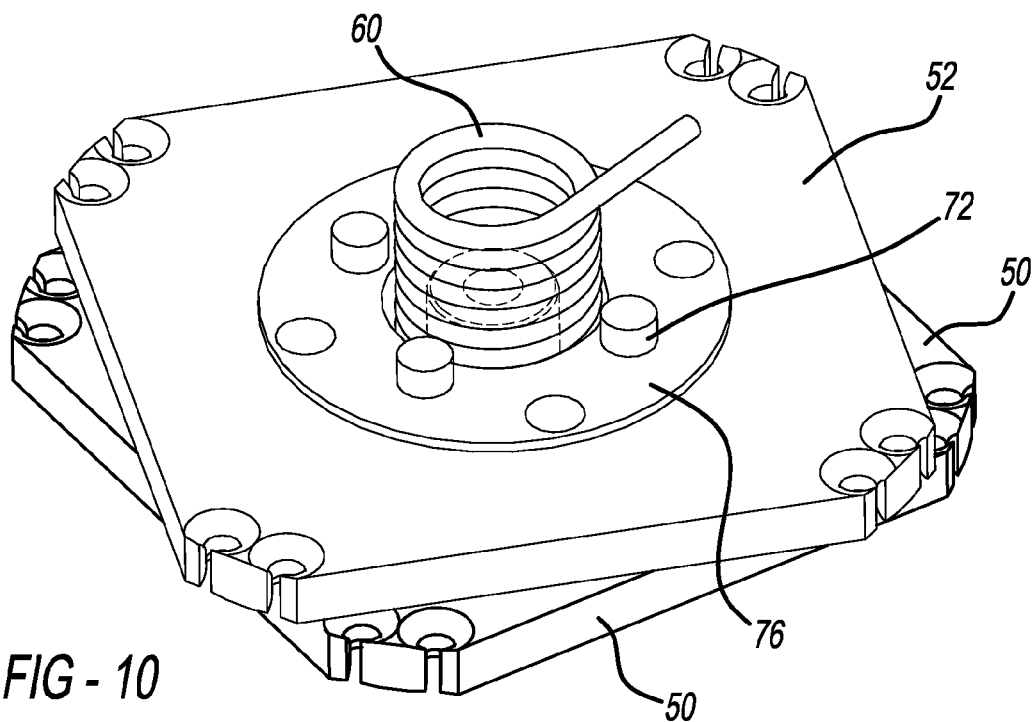
FIG. 10 is a perspective view including the plates of FIGS. 8 and 9 assembled together.

Example embodiments will now be described more fully with reference to the accompanying drawings.

Referring to FIGS. 1-15, an appliance 30 is provided with a rotary SMA actuator 32 for a latch of a washing machine door 34. Rotary SMA actuator 32 is coupled to a movable latch member 36, which are both coupled to a housing panel 38 of washing machine 30. A fixed cooperating latch member 40 is provided on washing machine door 34.

A housing 42 of rotary SMA actuator 32 includes a main body 44 and cover 46 defining a cylindrical cavity 48. A series of plate members 50, 52, and 54 are stacked together within cylindrical cavity 48. A non-rotatable end plate 50 is provided at one end of the stack and does not rotate relative to housing 42. A plurality of intermediate plate members 52 are rotatably coupled between non-rotatable end plate 50 and a rotatable end plate 54 at an opposing end of the stack. Rotatable plate members 52 and 54 rotate about a common axis. Rotatable end plate 54 includes a pin member 56 that extends through an arcuate slot 58 in actuator housing cover 46.

A biasing member 60 which can be in the form of a coiled spring is centered on the common axis and extends over posts 62 of end plate members 50 and 54. Spring member 60 includes an arm 64 at one end that cooperates with a slot 66 in non-rotatable plate member 50 to prevent the first end of spring 60 from rotating. The opposing end of spring 60 includes an arm 68 that cooperates with a slot 70 so that the opposing end of spring 60 rotates with rotating end plate member 54. Thus, spring member 60 biases each rotating plate member 52, 54 into a cold position.

Each plate member 50, 52, and 54 includes a raised annular portion 76 to create a space 78 between opposing faces of adjacent plate members. The interface between each pair of adjacent plate members 50, 52, and 54 includes cooperating stop limiting members in the form of pins 72 and slots 74 that cooperate to limit the relative angular rotation between adjacent plate members 50, 52, and 54. For example, each plate member 50, 52, and 54 may be limited to from about 3 to about 5 degrees rotation relative to adjacent plate members. In such a case, the four plate member design of this embodiment would provide a total rotation of from about 9 to about 15 degrees of pin member 56. Cooperating stop limiting features 72 and 74 can be positioned within raised annular portion 76.

Plate members 50, 52, and 54 may be formed as a single member including raised annular portions 76. As such, friction caused by relative rotation of the plate members 50, 52, and 54 may be reduced between the members by forming adjacent plate members from different materials. For example, adjacent plate members can be formed from one of two alternating materials. As another option, raised annular portions 76 can be at least partially formed from an alternative material to provide a low friction interface between adjacent plate members. In each case, contacting face portions of adjacent plate members are made of different materials.

Each plate member 50, 52, and 54 of this example embodiment has a generally square shape and includes a pair of notches 80 at each of the four corners. As can be seen, for example in FIG. 7, notches 80 have radiused edges adjacent both sides of the plate members 50, 52, and 54. A SMA wire 82 extends from each notch to a corresponding notch in adjacent plates to form four separated, generally parallel, generally helical wire paths between the corner notches 80 of the plate members 50, 52, and 54. As the SMA wire 82 passes from one notch 80 to a corresponding notch 80 in an adjacent plate member, they extend into the space 78 between opposing faces of the adjacent plate members. Each space 78 has a height corresponding to the vertical (with respect to FIG. 6) distance that the SMA wire traverses as it passes between adjacent plates. The height of space 78 is preferably large enough that SMA wire 82 segments of adjacent generally parallel, generally helical wire paths do not contact each other. In some cases, the height of space 78 is preferably at least about 3 times the diameter of the SMA wire 82. Although the height of each space 78 may in some instances be larger, the dimension of the height of the space 78 between adjacent members can be preferably less than about 10 times; and more preferably, less than about 5 times the diameter of the SMA wire 82.

Torque can also be helped by maintaining segments of SMA wire 82 passing between adjacent plate members at a relatively shallow angle. In some cases, the angle of segments of SMA wire 82 passing between adjacent plate members relative to the face of the adjacent plate members is preferably less than about 20 degrees; more preferably, less than about 15 degrees; even more preferably, less than about 10 degrees, and even more preferably, less than about 5 degrees.

In this embodiment, each generally parallel, generally helical wire path is comprised of two segments of SMA wire 82 that are separated via the corner notch pairs 80 to space the segments apart and provide more efficient cooling. Such more efficient cooling can lower the rotary actuator 32 cycle time by allowing SMA wire 82 to return to its cold state faster. Using multiple SMA wire 82 segments along each generally parallel, generally helical wire path also reduces the cycle time because smaller diameter wires cool faster, but increases the available torque because the total SMA wire 82 diameter along each wire path is increased. Torque may be further increased by providing multiple SMA wire 82 segments through each individual notch 80.

Figure 13:
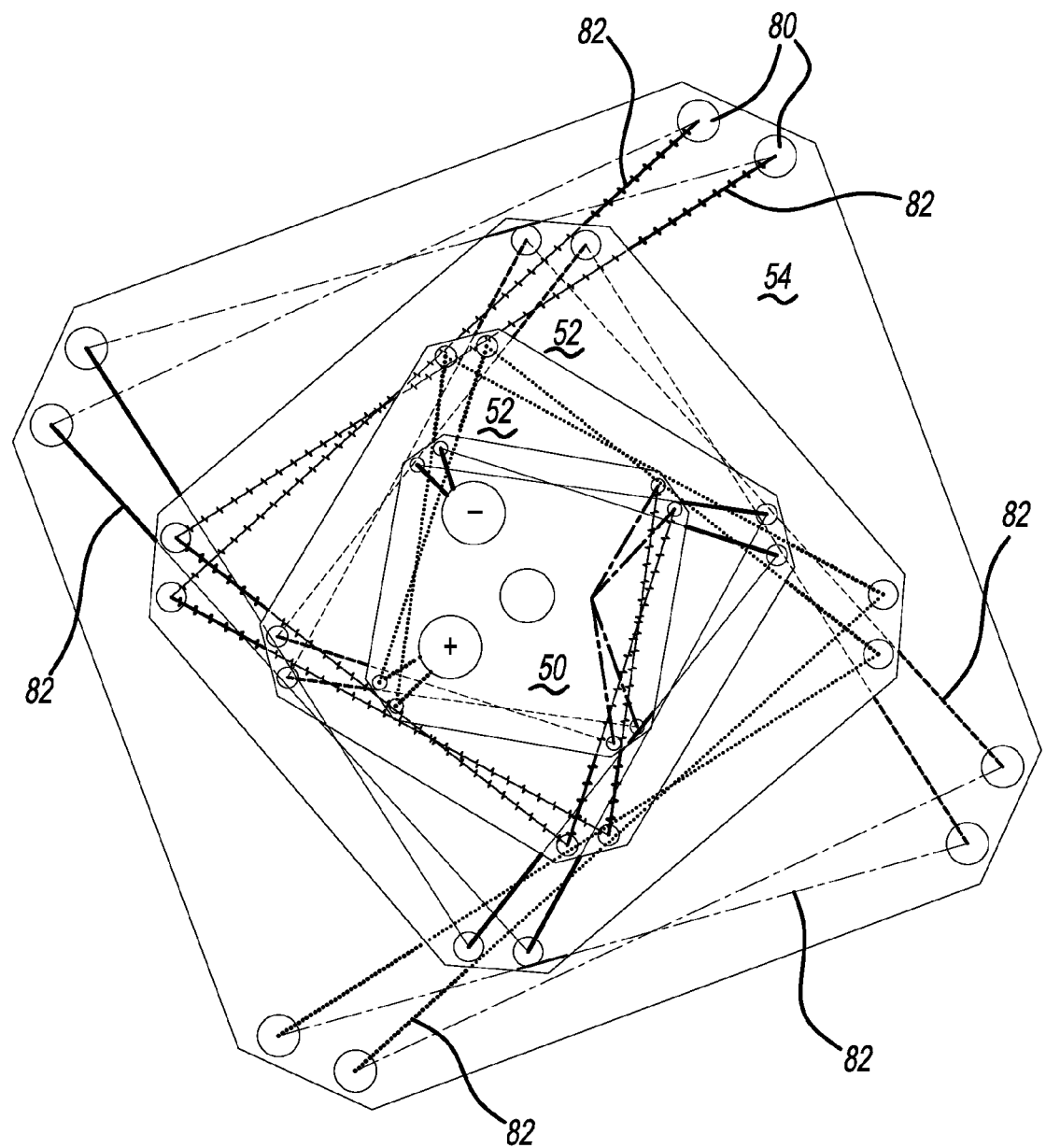
FIG. 13 is a wiring diagram wherein each successive plate member is enlarged to more easily show the wire paths of the SMA wire.
Figure 13A:
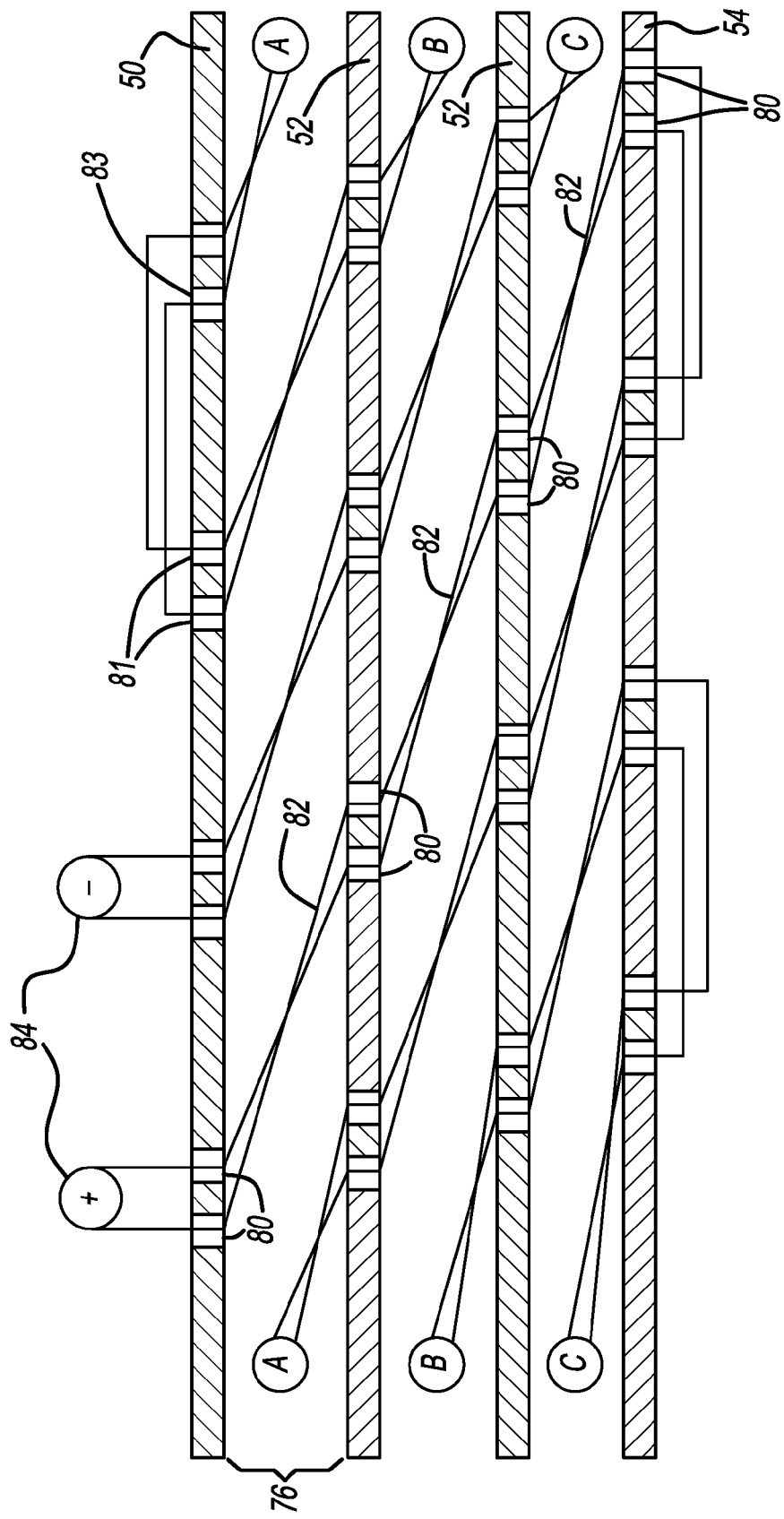
FIG. 13A is a wiring diagram wherein the notches of the plate members have all been aligned in the same plane to more easily show the wire paths of the SMA wire.

Two ways of representing the generally parallel, generally helical wire paths of this embodiment are provided in FIGS. 13 and 13A, respectively. In FIG. 13, each successive plate member is successively enlarged so that segments of SMA wire 82 can be seen more clearly. Additionally, in order to provide an indication of the level on which various line segments are passing, thinner or lighter line weights indicate those that are hidden in this diagrammatic view, while thicker line weights indicate where the wires are visible in this view.

In diagrammatic FIG. 13A, the notches 80 of the plate members 50, 52, and 54 are unfolded to extend along a flat plane. The generally helical nature of the wire paths, as well as the generally parallel nature of adjacent wire paths is apparent from these figures. In particular, it is worth noting that no segments of SMA wire 82 run in an opposite helical direction, so that no distinct helical wire paths cross each other. It is also worth noting that each generally parallel, generally helical wire path includes closely spaced notch pairs 80 in each plate member 50, 52, and 54. Although more than one segment of SMA wire 82 can pass through each notch 80 the use of pairs of notches 80 along each wire path spaces at least some such same wire path segments of SMA wire 82 apart from each other allowing them to cool faster, reducing the cycle time of the rotary actuator 32.

Figure 14:
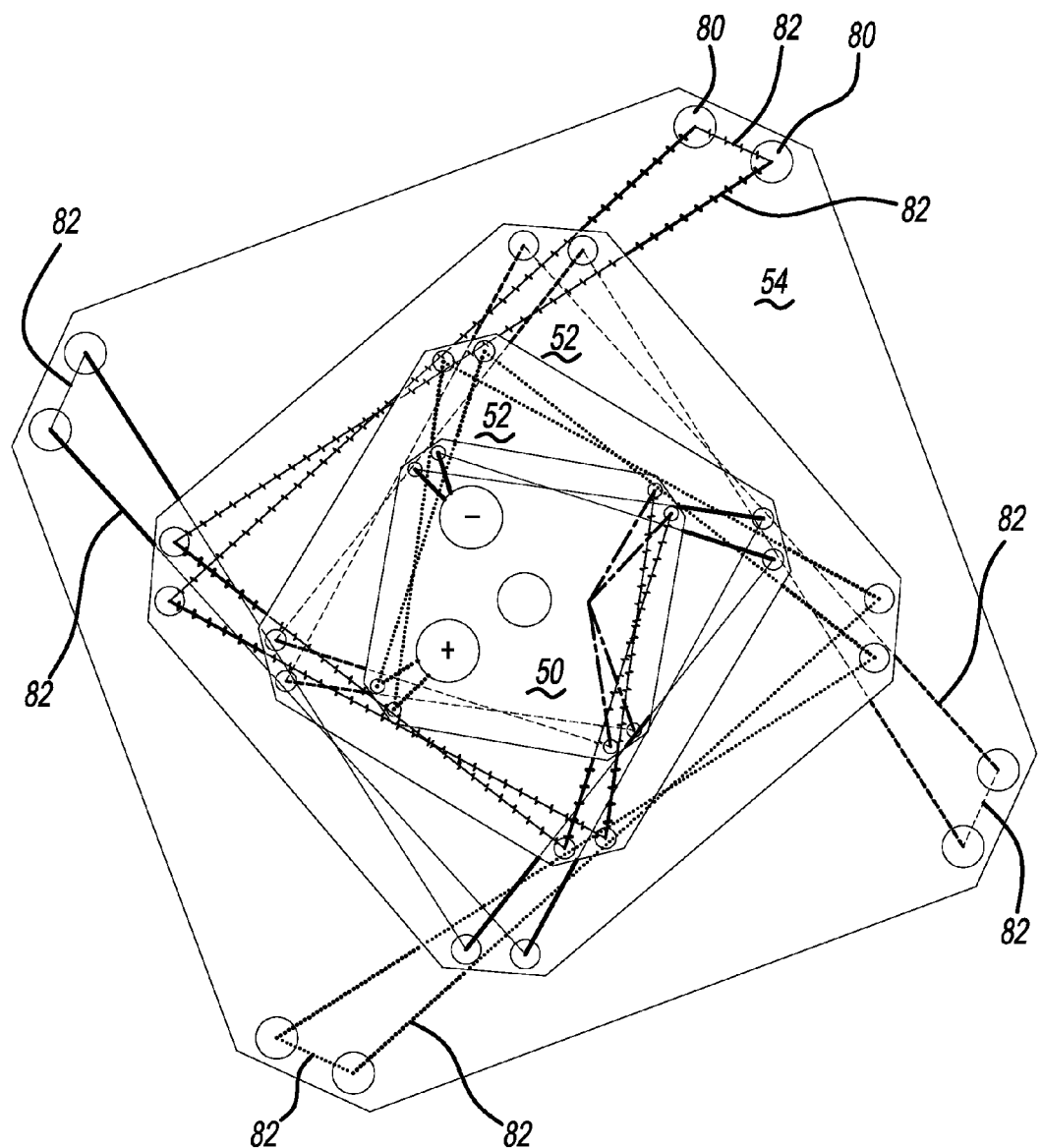
FIG. 14 is a wiring diagram similar to FIG. 13, but showing an alternative wiring arrangement.
Figure 15:
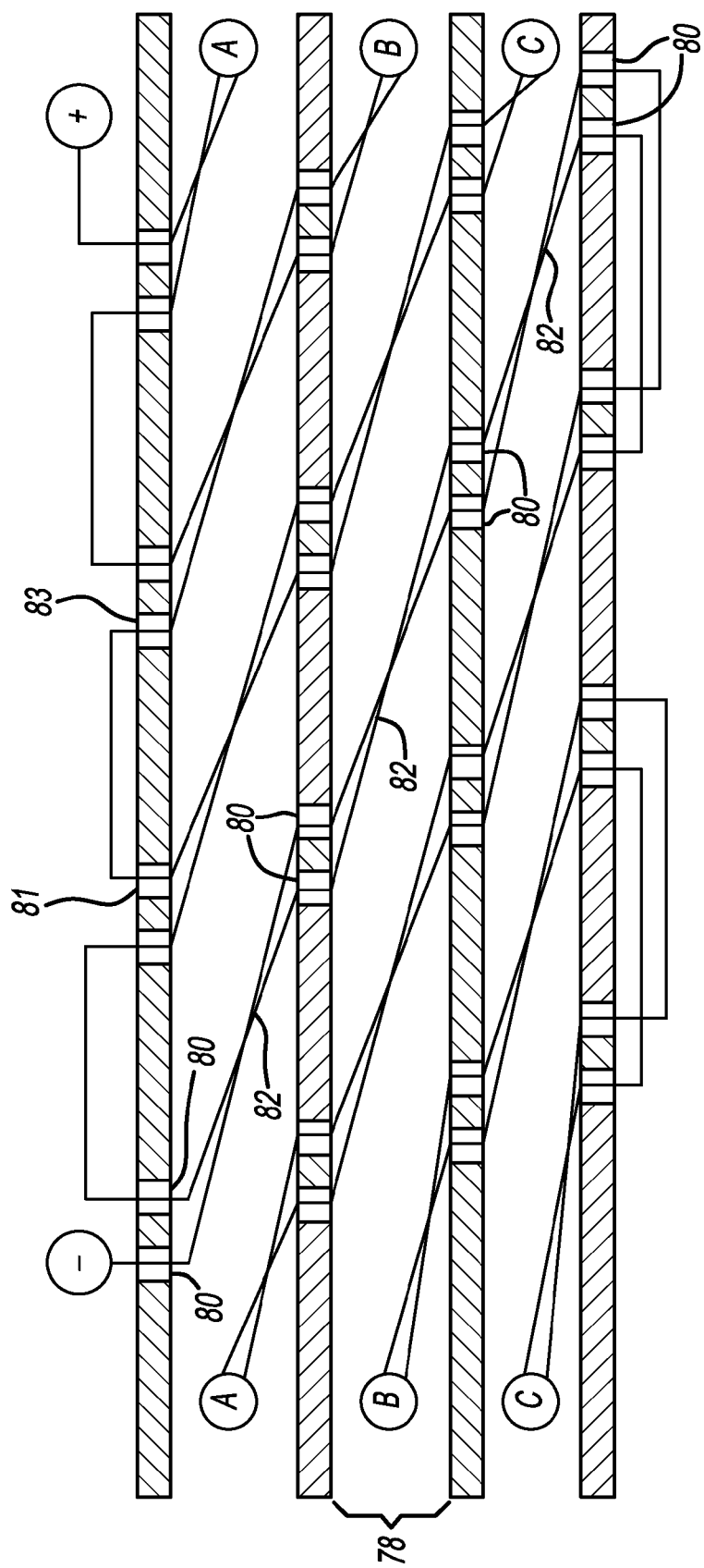
FIG. 15 is a wiring diagram similar to FIG. 13A, but showing the alternative wiring arrangement of FIG. 14.
Figures 17, 18:
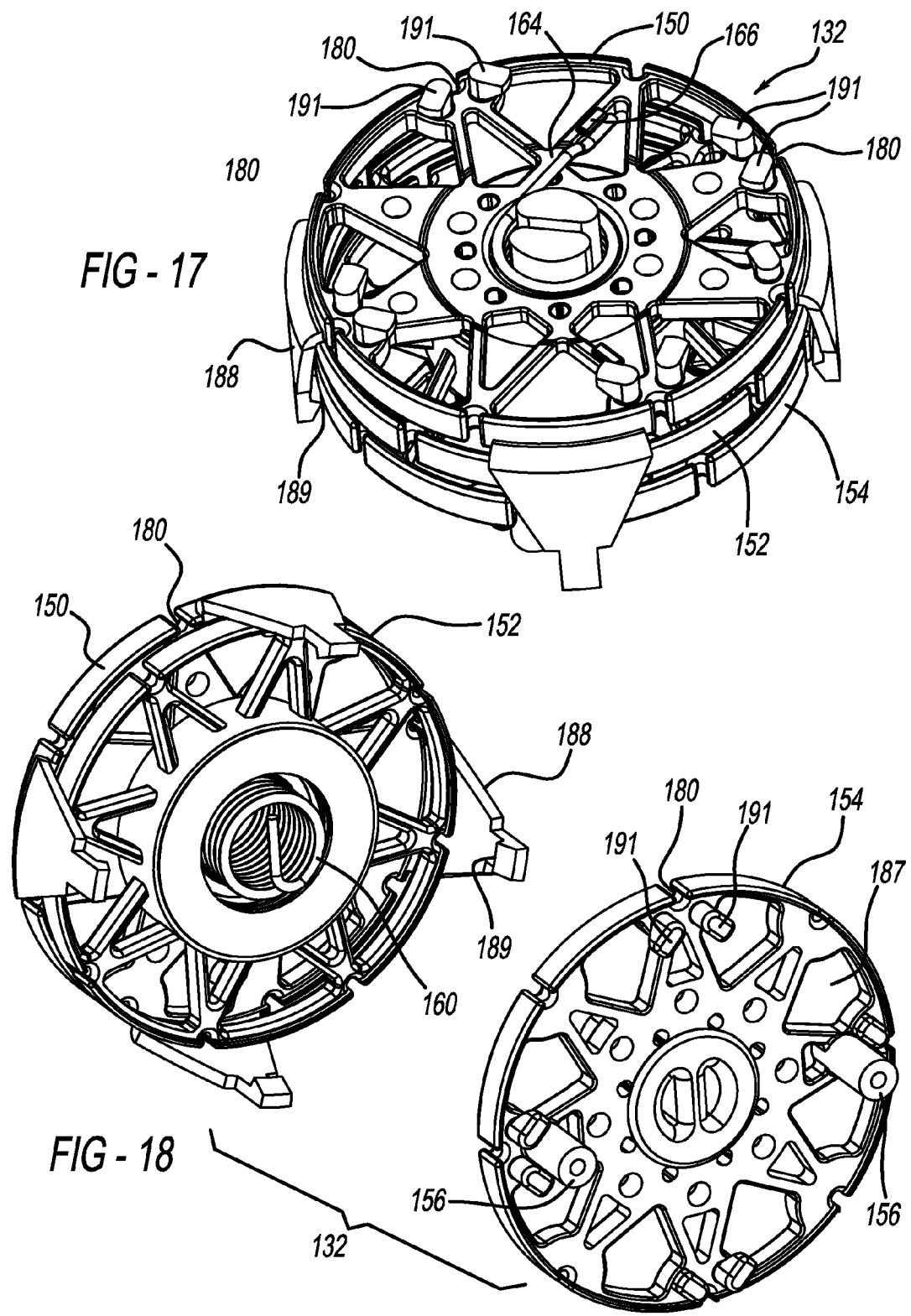
FIG. 17 is a perspective view of the rotary actuator of FIG. 16.
FIG. 18 is a partial exploded perspective view of the rotary actuator of FIG. 16.
Figure 19:
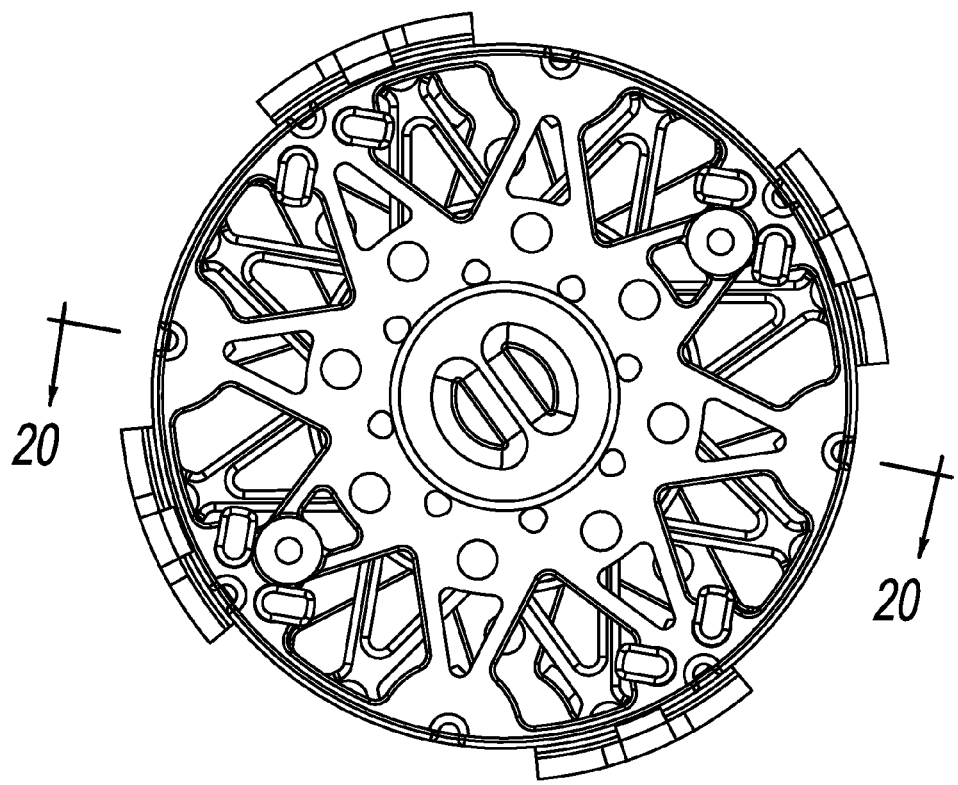
FIG. 19 is a bottom plan view of the rotary actuator of FIG. 16.
Figure 20:
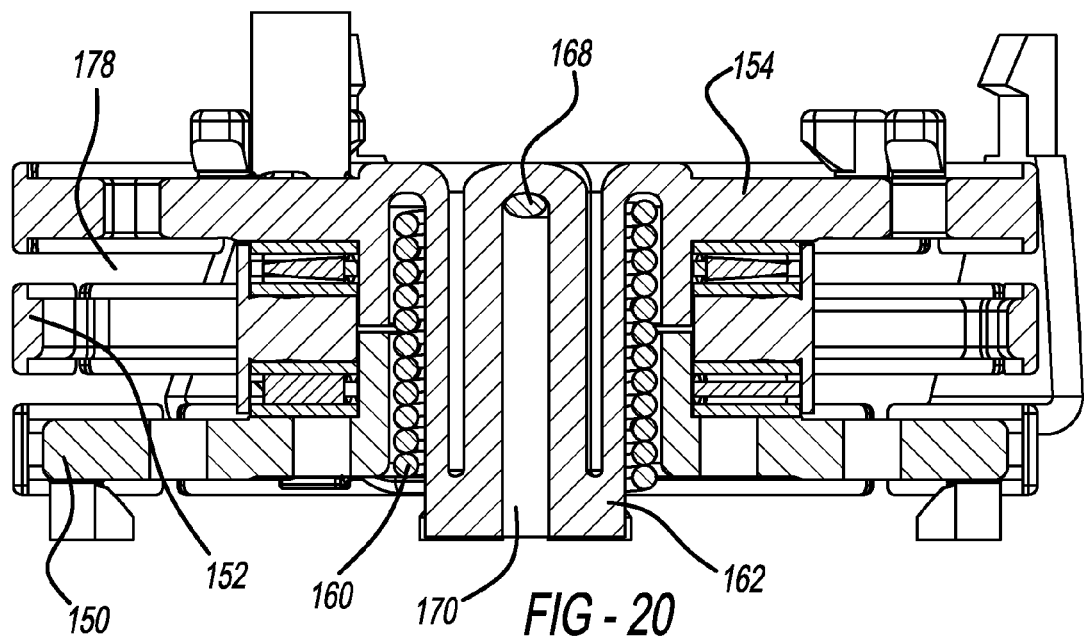
FIG. 20 is a cross-sectional view taken along line 20-20 of FIG. 19.

FIGS. 14 and 15 illustrate an alternative wiring pattern. This wiring pattern could be used, for example, with a silicone coated SMA wire 82. Since the silicone coating provides for conduction cooling of such a SMA wire 82, a larger diameter SMA wire 82 can be used without sacrificing cycle time. The silicone coating may also avoid short circuiting that could result from various potential wiring patterns for the generally parallel, generally helical wire paths. Note here too that no wires cross between distinct generally parallel, generally helical wire paths. Here too, each notch 80 or wire path can include multiple segments of SMA wire 82 running together.

In each of FIGS. 13A and 15 a single generally parallel, generally helical wire path has been indicated by identifying the associated notches 80 and segments of the SMA wire 82 that define that particular wire path. As can be envisioned, segments of SMA wire 82 of adjacent wire paths can pass under and over each in space 78. In some cases, it is preferable that the height of space 78 is sufficiently large that such segments of SMA wire 82 of adjacent wire paths do not contact each other as discussed above.

In addition each of FIGS. 13A and 15 illustrate a current source coupled to SMA wire 82 at a single pair of terminals 84. A second pair of terminals can be provided for example between notches referenced as 81 and 83 so that portions of SMA wire 82 are coupled in parallel to the current source.

As should be apparent from the above, the SMA wire 82 exerts an unbalanced moment force tending to bend each of the end plate members 50 and 54 toward the center. In contrast, SMA wire 82 exerts generally balanced moment forces in each direction on intermediate plate members 52, tending to negate bending of intermediate plate members 52. Thus, intermediate plate members 52 may be less ridged than end plate members 50 and 54. For example, end plate members 50 and 54 may be made of a stiffer material, may be thicker, or both, than intermediate plate members 52.

Electrical terminals 84 can be provided on the outer face of non-rotatable plate member 50 to couple an electric current source to SMA wire 82. As noted above, one or more terminal pairs 84 may be used. A single terminal pair 84 may be used in cases where the required current and voltage are acceptable. The resistance of SMA wire 82 can be reduced by providing a second terminal pair at a midpoint of SMA wire 82 as discussed above. This reduction in resistance would double the required current, and halve the required voltage. The resistance can further be reduced by the use of additional terminal pairs 84 along the SMA wire 82.

Figure 11:
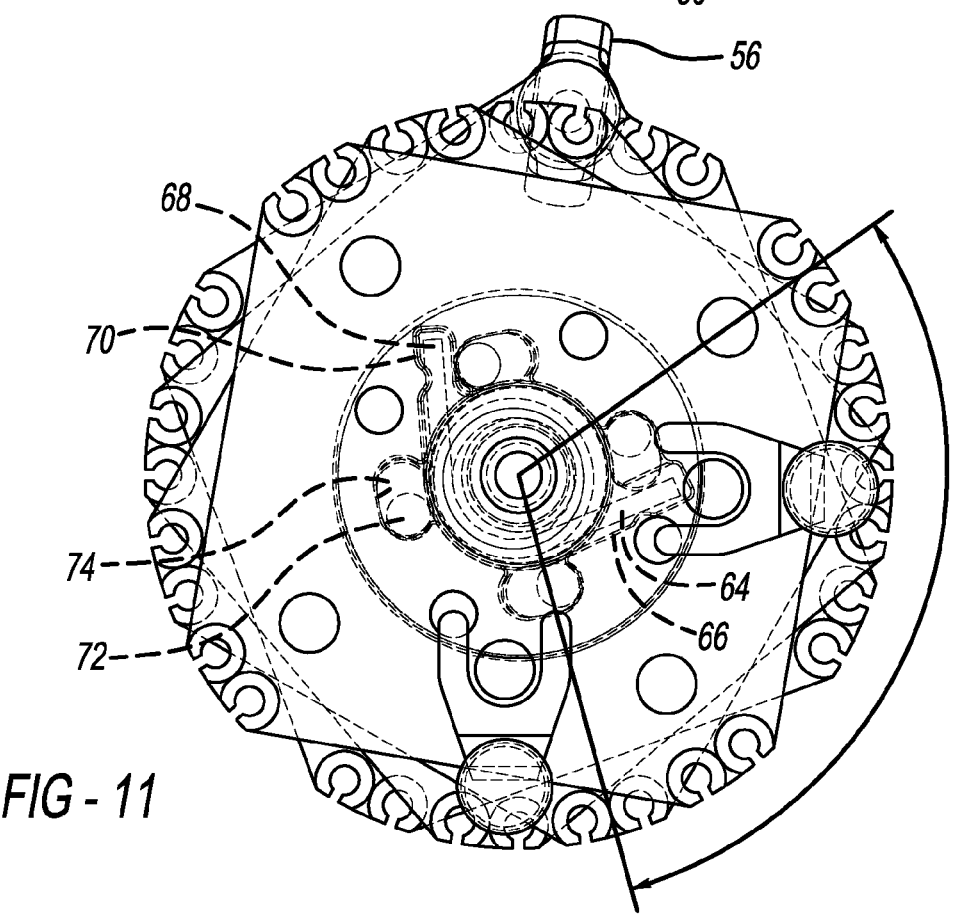
FIG. 11 is a top plan view of the various of the rotary actuator of FIG. 1; shown in an initial position.
Figure 12:
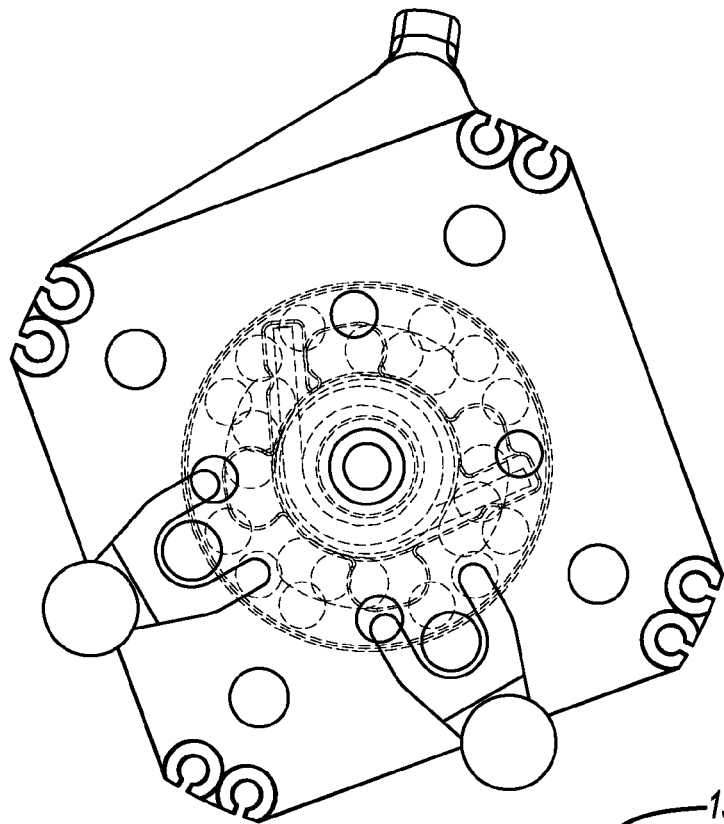
FIG. 12 is a top plan view similar to FIG. 11, but shown in an actuated position wherein all of the plate members are aligned.
Figure 16:
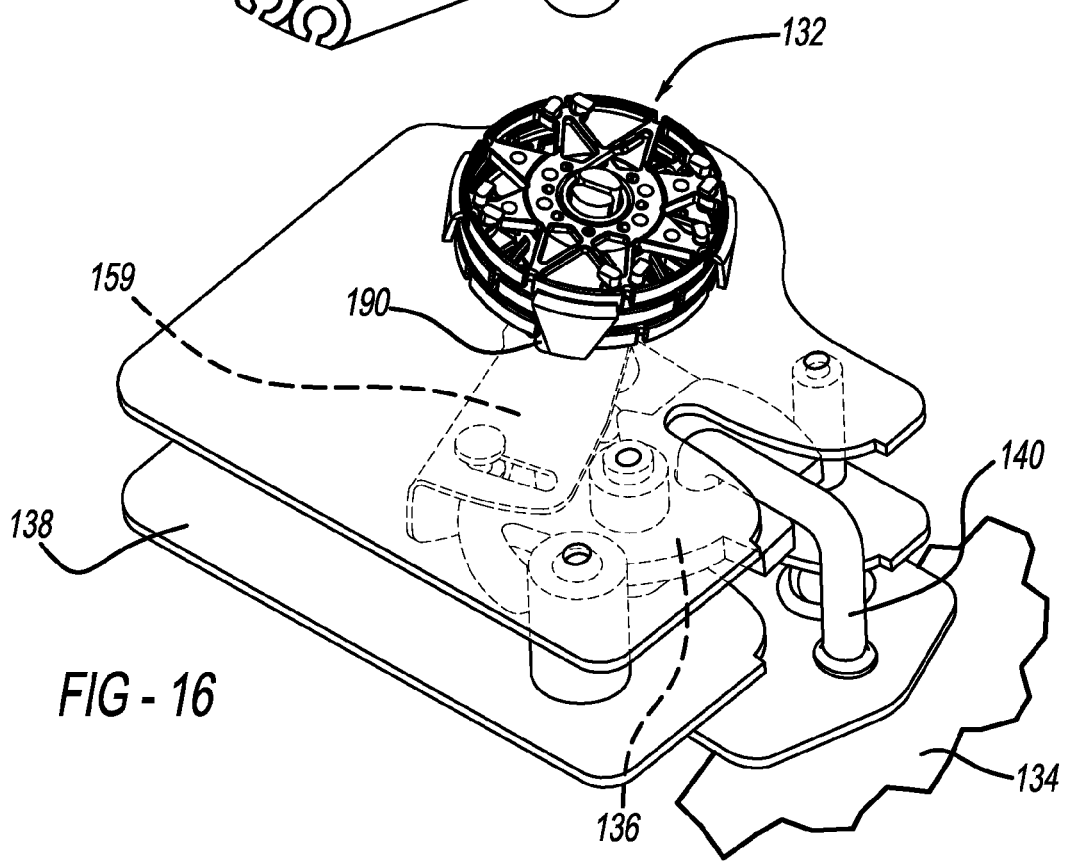
FIG. 16 is a partial perspective view of an automobile latch comprising a rotary actuator of the present disclosure.

The use of multiple segments of SMA wire 82 along each wire path also increases the available torque, as a result of the increased cross-sectional area of SMA wire 82 along each wire path. The amount of available torque and travel is also dependent upon the initial offset angle between adjacent pairs of cooperating notches along the wire paths. As shown in FIG. 11, adjacent pairs of cooperating notches have an offset angle of about 110 degrees. This offset angle may approach 180 degrees, although one preferred range is between about 80 and 120 degrees.

The amount of radial travel that can be imparted to pin member 56 can be increased by increasing the number of plate members 50, 52, and 54. Simply increasing the number of intermediate plate members 52 allows the planar dimensions of the plate members 52 and corresponding dimensions of the actuator to remain the same; and therefore, provides increased travel without increasing the corresponding overall dimensions of the rotary actuator 32. The amount of radial travel that can be imparted to pin member 56 can also be increased by increasing the planar dimensions (size) of the plate members 50, 52, and 54. Simply increasing these planar dimensions allows the number of plate members 50, 52, and 54 to remain the same; and therefore can provide increased radial travel with the same number of plate members 50, 52, and 54.

As indicated above, the desired cycle time for actuators such as those used in automotive and appliance latches is relatively short. The cycle time is the time it takes for the rotary actuator to move between the cold position to the hot position and back. Accordingly, although in some cases it can be longer, the cycle time of the rotary actuator is preferably less than about 5 seconds; and more preferably, less than about 4 seconds; even more preferably, less than about 3 seconds; even more preferably, less than about 2 seconds; even more preferably, less than about 1 second; and even more preferably, less than about 0.5 second.

Also related to cycle time, the diameter of SMA wire may in some cases be preferably less than about 0.5 mm; and more preferably, less than about 0.1 mm.

Referring to FIGS. 16 through 22, an automobile latch with second exemplary rotary actuator 132 embodiment includes three circular plate members 150, 152, and 154. Features of this embodiment use the same reference numerals incremented by 100 as corresponding features of the previous embodiment. Accordingly, there is no need to repeat common aspects of such corresponding features again. Instead, the following discussion will focus primarily on additional or different features.

Plate members 150, 152, and 154 of this embodiment have an overall generally round shape defined by a peripheral ring 185 and a generally annular central portion 175 with a plurality of spoke members 186 extending between outer peripheral ring 185 and the central annular portion 176. As a result, relatively large apertures 187 extend through each of plate members 150, 152, and 154.

Each opposing side of the intermediate member 152 includes a raised annular portion 176 providing, at least in part, space 178 between opposing faces of adjacent plate members. As discussed with the prior embodiment, as the SMA wire 182 passes from one notch 180 to a corresponding notch 180 in an adjacent plate member, SMA wire 182 extends into the space 178 between opposing faces of the adjacent plate members. In addition, preferred height dimensions of space 178 are the same as that discussed with regard to the prior embodiment.

A biasing member 160 which can be in the form of a coiled spring is centered on the common axis and extends over a central post 162 of rotary end plate member 154. Spring member 160 includes an arm 164 at one end that is retained by a retention member 166 in the form of a protrusion extending from an outer face of non-rotatable plate member 150 to prevent the first end of spring 160 from rotating. The opposing end of spring 160 includes an inwardly projecting arm 168 that cooperates with a slot 170 so that the opposing end of spring 160 rotates with rotating end plate member 154. Thus, spring member 160 biases each rotating plate member 152, 154 toward a cold position.

Rotary actuator 132 includes four resilient tab members 188 extending from a periphery of non-rotatable plate member 150. Each tab member 188 includes a detent member 189 at its distal end. The trunk latch assembly includes four cooperating slots 190. Thus, when resilient tab members 188 are inserted into cooperating slots 190, rotary actuator 132 is retained in position via a snap-fit arrangement between cooperating members 190 and 188, including detent members 189.

Rotatable end plate member 154 includes a pair of pin members 156; one on each side of the center and positioned along a line passing through the center and near the periphery of rotatable end plate member 154. An actuator arm 157 is coupled to both pin members 156 to rotate when actuator 132 actuates to disengage or engage trunk latching member 136 from cooperating latch member 140.

The outer faces of each end plate member 150 and 154 include wire positioning members 191 in the form of elongated protrusions adjacent at least some of notches 180. Thus, wire positioning members 191 can separate multiple segments of SMA wire 182 separate in the adjacent notch 180 and as they run along the outer faces of the end members. For example, one segment of the SMA wire 182 can pass along one side of a particular wire positioning member 191 as it passes into or out of an adjacent notch, while a second segment of the SMA wire 182 can pass along the opposite side of the same wire positioning member 191 as it passes into or out of the same notch. These wire positioning members can operate to separate segments of SMA wire 182 as it passes through an adjacent notch 180, and/or along an outer face of the respective end plate members 150, 154 as SMA wire passes to an adjacent notch 180.

Figure 21:
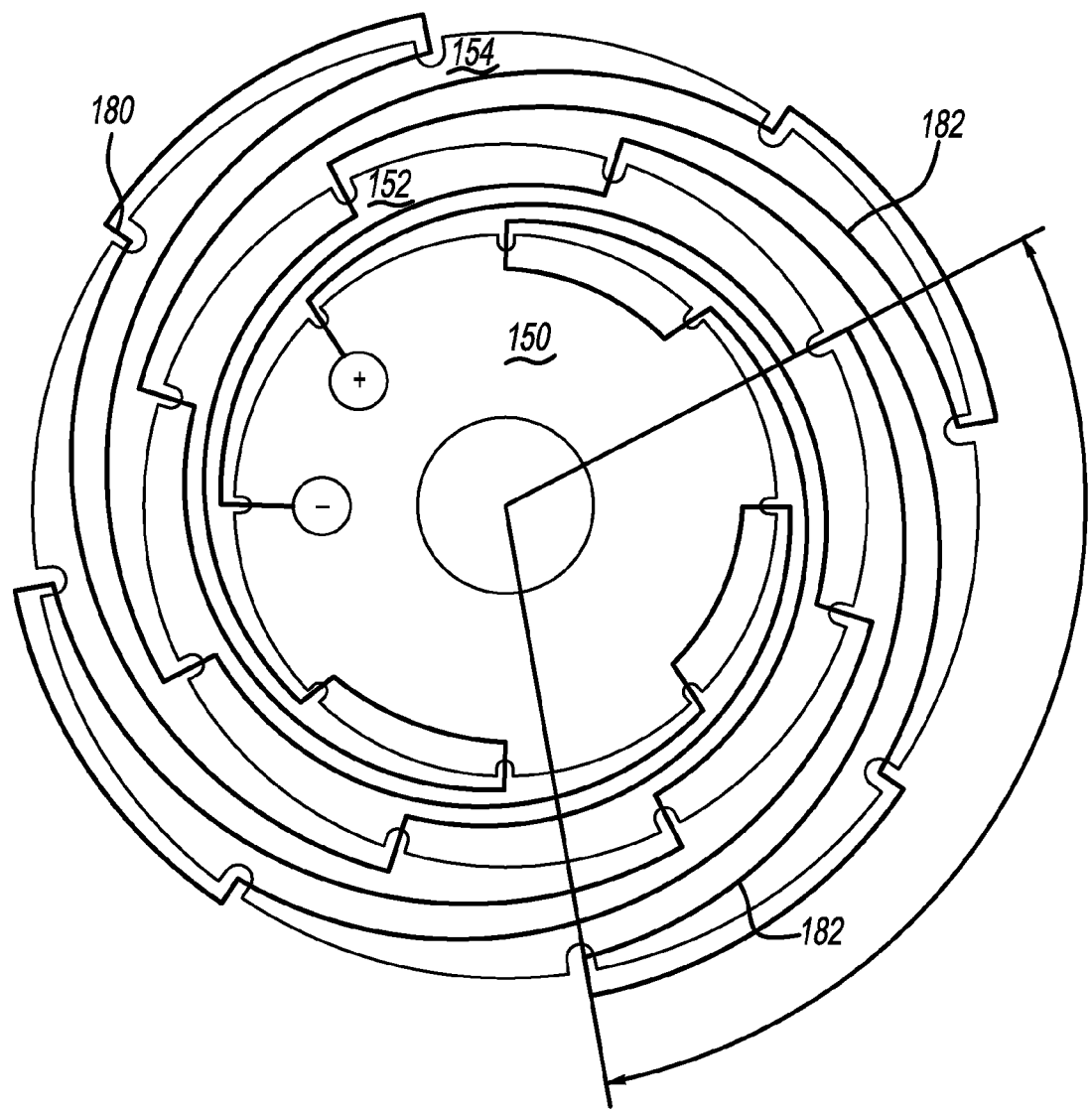
FIG. 21 is a wiring diagram similar to FIG. 13, but for the rotary actuator of FIG. 16.

FIG. 21 is a diagrammatic illustration similar to FIGS. 13 and 14. In FIG. 21 each successive plate member is successively enlarged so that segments of SMA wire 82 can be seen more clearly. In order to avoid the necessity of using different line weights in this diagram, however, SMA wire 182 is shown to extend laterally beyond the respective plate member as it passes through each notch 180 and SMA wire is shown curved slightly so that it does not pass under any portion of any plate member.

Figure 22:
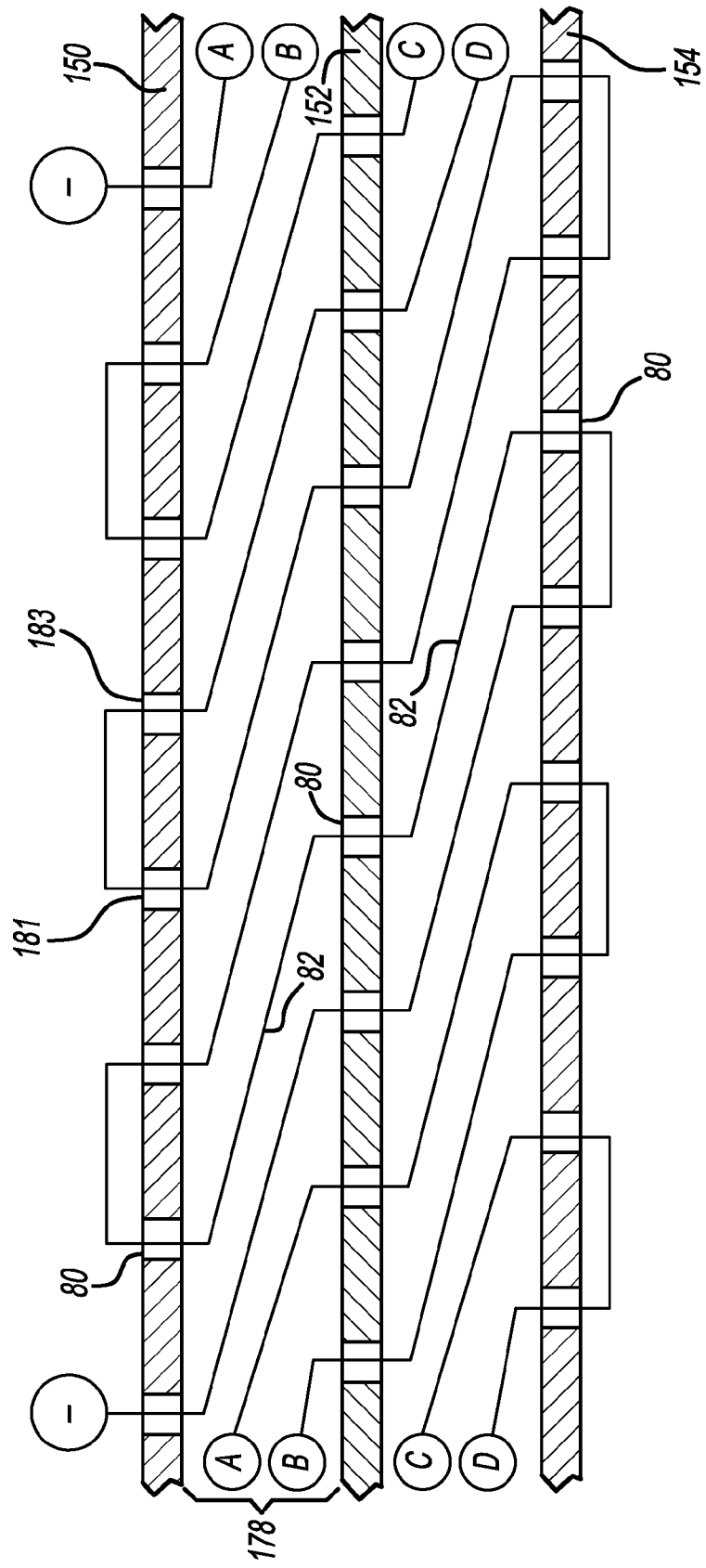
FIG. 22 is a wiring diagram similar to FIG. 13A, but for the rotary actuator of FIG. 16.

FIG. 22 is a diagrammatic illustration similar to FIGS. 13A and 15. As can be seen in FIG. 22, segments of SMA wire 182 of adjacent wire paths can pass above or below each other as the segments pass through space 178 between opposing faces of adjacent plate members 150, 152, 154. In some cases, it is preferable that the height of space 178 is sufficient that such segments of SMA wire 182 of adjacent wire paths do not contact each other as discussed above.

Figure 23:
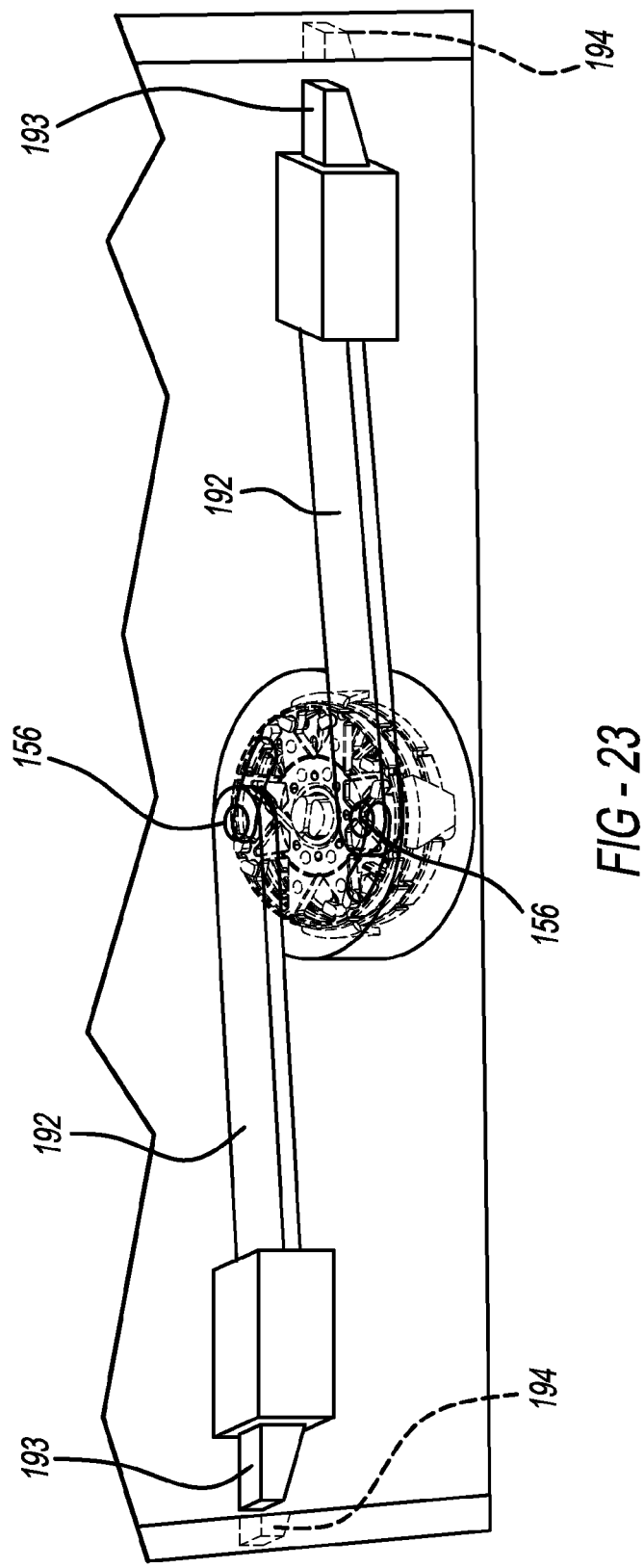
FIG. 23 is an alternative latch mechanism incorporating the rotary actuator of FIG. 16.

Referring to FIG. 23, an alternative embodiment of an appliance or automobile latch is illustrated using rotary actuator 132 of FIGS. 17-22. In this embodiment each pin member 156 is coupled to one of the two latching arms 192. Thus, upon actuation of the actuator 132, the latching arms 192 move in opposite directions to latch and unlatch movable latch members 193 from cooperating latch members 194. Movable latch members 193 can be fixed to an automobile or appliance door with cooperating latch members 194 coupled to an appliance or automobile body member, or vice versa.

The foregoing description of the embodiments has been provided for purposes of illustration and description. It is not intended to be exhaustive or to limit the disclosure. Individual elements or features of a particular embodiment are generally not limited to that particular embodiment. Any element(s) or feature(s) from one embodiment can be combined or interchanged with element(s) or feature(s) of any other embodiment, even if any such combination or interchangeability is not specifically shown or described in the specification or claims all such possible combinations are included within this disclosure. The same may also be varied in many ways. For example, rotary actuator 32 of FIGS. 5-15 can alternatively be used as a component of an automobile door latch, and rotary actuator 132 of FIGS. 17-22 can alternatively be used as a component of an appliance door latch. Such variations are not to be regarded as a departure from the disclosure, and all such modifications are intended to be included within the scope of the disclosure.

What is claimed is:

1. A rotary actuator comprising:
   a plurality of plate members comprising:
   a non-rotatable end plate member having a plurality of notches at its periphery;
   a rotatable end plate member comprising a plurality of notches at its periphery;
   at least one intermediate rotatable plate member having a plurality of notches at its periphery, the intermediate rotatable plate member being coaxial with end plate members;
   wherein the at least one intermediate rotatable plate member is sandwiched in a stack between the non-rotatable end plate member and the rotatable end plate member;
   a spring providing a biasing force tending to cause the rotatable end plate member to rotate in a biasing direction relative to the non-rotatable end plate member;
   a SMA wire extending through the plurality of notches so that generally helical wire paths all extend in one of the clockwise or counterclockwise direction from the non-rotatable end plate member to the rotatable end plate member;
   wherein as the SMA wire is heated, the SMA wire rotates each rotatable plate member from a cold position in a direction opposite the biasing direction to a hot position; and as the SMA wire cools, the spring rotates each rotatable plate member in the biasing direction from the hot position and returns each rotatable plate member to the cold position; and a latch operably moved by the SMA wire.

2. The rotary actuator according to claim 1, wherein the generally helical wire paths, are further generally parallel to each other.

3. The rotary actuator according to claim 1, wherein the SMA wire comprises a first pair of ends coupled to an outer face of the non-rotatable plate member in a fixed position, and a current source is electrically coupled to the first pair of ends, and wherein the SMA wire further comprises a second pair of ends coupled to an outer face of the non-rotatable plate member in a fixed position, and the current source is electrically coupled to the second pair of ends so that segments of the SMA wire between each pair of ends are coupled to the current source in parallel.

4. The rotary actuator according to claim 1, wherein an interface between each pair of adjacent plate members comprises a stop limiting member associated with one of each pair of adjacent plate members and a cooperating stop limiting member associated with the other of each pair of adjacent plate members operating to limit the relative rotation between the pair of adjacent plate members in the biasing direction.

5. The rotary actuator according to claim 1, further comprising wire guide members to separate the segments of the SMA wire from each other as they pass through each notch along the wire path.

6. The rotary actuator according to claim 1, wherein the latch is coupled to one of an appliance body and an appliance door of an appliance, and the SMA wire is coupled to an electrical system of the appliance via a switch to selectively apply an electrical current to the SMA wire.

7. The rotary actuator according to claim 1, wherein the latch is coupled to one of an automobile body and an automobile door of an automobile, and the SMA wire is coupled to an electrical system of the automobile via a switch to selectively apply an electrical current to the SMA wire.

8. The rotary actuator according to claim 1, further comprising a coating on the SMA wire to avoid short circuiting of the SMA wire.

9. The rotary actuator according to claim 1, wherein the spring is a coiled spring coaxial with the intermediate and end plate members.

10. A rotary actuator comprising:
a plurality of plate members comprising:
 a non-rotatable end plate member having a plurality of notches at its periphery;
 a rotatable end plate member having a plurality of notches at its periphery;
 at least one intermediate rotatable plate member having a plurality of notches at its periphery; and
 wherein the at least one intermediate rotatable plate member is sandwiched in a stack between the non-rotatable end plate member and the rotatable end plate member, and wherein opposing faces of adjacent plate members in the stack are separated from each other to provide an open space between the opposing faces of each pair of adjacent plate members;

a biasing member providing a biasing force tending to cause the rotatable end plate member to rotate in a biasing direction relative to the non-rotatable end plate member;

a SMA wire extending through the plurality of notches so that a plurality of wire paths extend between the non-rotatable end plate member and the rotatable end plate member, wherein every one of the plurality of wire paths includes at least one segment of the SMA wire positioned within the open space between the opposing faces of each pair of adjacent plate members without contacting any segment of the SMA wire defining any other wire path;

wherein as the SMA wire is heated, the SMA wire rotates each rotatable plate member from a cold position in a direction opposite the biasing direction to a hot position; and as the SMA wire cools, the biasing member rotates each rotatable plate member in the biasing direction from the hot position and returns each rotatable plate member to the cold position; and a coating located on the SMA wire.

11. The rotary according to claim 10, wherein an interface between adjacent plate members includes at least one annular raised portion that separates the opposing faces and provides the open space between the opposing faces.

12. The rotary actuator according to claim 10, wherein the SMA wire comprises a first pair of ends coupled to an outer face of the non-rotatable plate member in a fixed position, and a current source is electrically coupled to the first pair of ends, and wherein the SMA wire further comprises a second pair of ends coupled to an outer face of the non-rotatable plate member in a fixed position, and the current source is electrically coupled to the second pair of ends so that segments of the SMA wire between each pair of ends are coupled to the current source in parallel.

13. The rotary actuator according to claim 10, wherein an interface between each pair of adjacent plate members comprises a stop limiting member associated with one of each pair of adjacent plate members and a cooperating stop limiting member associated with the other of each pair of adjacent plate members operating to limit the relative rotation between the pair of adjacent plate members in the biasing direction.

14. The rotary actuator according to claim 10, further comprising wire guide members to separate the segments of the SMA wire from each other as they pass through each notch along the wire path.

15. The rotary actuator according to claim 10, further comprising a latch coupled to one of an appliance body and an appliance door of an appliance, the SMA wire operably moving the latch, the SMA wire being coupled to an electrical system of the appliance via a switch to selectively apply an electrical current to the SMA wire, and the intermediate rotatable plate member being coaxial with the end plate members.

16. The rotary actuator according to claim 10, further comprising a latch coupled to one of an automobile body and an automobile door of an automobile, the SMA wire operably moving the latch, the SMA wire being coupled to an electrical system of the automobile via a switch to selectively apply an electrical current to the SMA wire, and the intermediate rotatable plate member being coaxial with the end plate members.

17. A rotary actuator comprising:
a plurality of plate members comprising:
 a non-rotatable end plate member having a plurality of notches at its periphery;

a rotatable end plate member having a plurality of notches at its periphery;

at least one intermediate rotatable plate member having a plurality of notches at its periphery; and wherein the at least one intermediate rotatable plate member is sandwiched in a stack between the non-rotatable end plate member and the rotatable end plate member, and wherein opposing faces of adjacent plate members in the stack are separated from each other to provide an open space between the opposing faces of each pair of adjacent plate members;

a biasing member providing a biasing force tending to cause the rotatable end plate member to rotate in a biasing direction relative to the non-rotatable end plate member;

a SMA wire extending through the plurality of notches so that generally helical wire paths all extend in one of the clockwise or counterclockwise direction from the non-rotatable end plate member to the rotatable end plate member, and the SMA wire extending through the plurality of notches so that a plurality of wire paths extend between the non-rotatable end plate member and the rotatable end plate member, wherein every one of the plurality of wire paths includes at least one segment of the SMA wire positioned within the open space between the opposing faces of each pair of adjacent plate members without contacting any segment of the SMA wire defining any other wire path;

wherein as the SMA wire is heated, the SMA wire rotates each rotatable plate member from a cold position in a direction opposite the biasing direction to a hot position; and as the SMA wire cools, the biasing member rotates each rotatable plate member in the biasing direction from the hot position and returns each rotatable plate member to the cold position; and an automobile latch or an appliance latch operably moved when the SMA wire rotates each rotatable plate member.

18. The rotary actuator according to claim 17, wherein the SMA wire comprises a first pair of ends coupled to an outer face of the non-rotatable plate member in a fixed position, and a current source is electrically coupled to the first pair of ends, and wherein the SMA wire further comprises a second pair of ends coupled to an outer face of the non-rotatable plate member in a fixed position, and the current source is electrically coupled to the second pair of ends so that segments of the SMA wire between each pair of ends are coupled to the current source in parallel.

19. The rotary actuator according to claim 17, wherein an interface between each pair of adjacent plate members comprises a stop limiting member associated with one of each pair of adjacent plate members and a cooperating stop limiting member associated with the other of each pair of adjacent plate members operating to limit the relative rotation between the pair of adjacent plate members in the biasing direction.

20. The rotary actuator according to claim 17, further comprising wire guide members to separate the segments of the SMA wire from each other as they pass through each notch along the wire path.

21. The rotary actuator according to claim 17, wherein the latch is coupled to one of an appliance body and an appliance door of an appliance, and the SMA wire is coupled to an electrical system of the appliance via a switch to selectively apply an electrical current to the SMA wire.

22. The rotary actuator according to claim 17, wherein the latch is coupled to one of an automobile body and an automobile door of an automobile, and the SMA wire is coupled to an electrical system of the automobile via a switch to selectively apply an electrical current to the SMA wire.

23. The rotary actuator according to claim 17, further comprising a coating on the SMA wire to avoid short circuiting of the SMA wire.

* * * * *